United States Patent
Matsuo et al.

(10) Patent No.: US 8,335,354 B2
(45) Date of Patent: Dec. 18, 2012

(54) APPARATUS FOR REGISTERING FACE IDENTIFICATION FEATURES, METHOD FOR REGISTERING THE SAME, PROGRAM FOR REGISTERING THE SAME, AND RECORDING MEDIUM

(75) Inventors: Kenji Matsuo, Fujimino (JP); Kazunori Matsumoto, Fujimino (JP)

(73) Assignee: KDDI Corporation, Tokyo (JP)

( * ) Notice: Subject to any disclaimer, the term of this patent is extended or adjusted under 35 U.S.C. 154(b) by 649 days.

(21) Appl. No.: 12/559,523

(22) Filed: Sep. 15, 2009

(65) Prior Publication Data

US 2010/0067750 A1 Mar. 18, 2010

(30) Foreign Application Priority Data

Sep. 16, 2008 (JP) .................... 2008-236576

(51) Int. Cl.
*G06K 9/00* (2006.01)
(52) U.S. Cl. ...................................... 382/118
(58) Field of Classification Search .............. 382/118
See application file for complete search history.

(56) References Cited

U.S. PATENT DOCUMENTS

| | | | | |
|---|---|---|---|---|
| 5,907,838 | A * | 5/1999 | Miyasaka et al. | 707/740 |
| 6,035,055 | A | 3/2000 | Wang et al. | |
| 7,403,642 | B2 * | 7/2008 | Zhang et al. | 382/118 |
| 2006/0285824 | A1 | 12/2006 | Osaki | |

FOREIGN PATENT DOCUMENTS

| | | |
|---|---|---|
| EP | 0944019 | 9/2001 |
| EP | 1826706 | 8/2007 |
| JP | 6259534 | 9/1994 |
| JP | 9251534 | 9/1997 |
| JP | 2001167110 | 6/2001 |
| JP | 2002133423 | 5/2002 |
| JP | 2002189724 | 7/2002 |
| JP | 2005115481 | 4/2005 |
| JP | 2007249588 | 9/2007 |
| JP | 2008-181346 | 7/2008 |
| JP | 2008243906 | 10/2008 |

OTHER PUBLICATIONS

Combined Search and Examination Report under Sections 17 and 18(3) from related Great Britain Application No. GB0916197.7 (5 pages).
Viola, Paul and Jones, Michael; "Robust" Real-time Object Detection, Second International Workshop on Statistical and Computational Theories of Vision—Modeling, Learning, Computing, and Sampling; Vancouver, Canada, Jul. 13, 2001; pp. 1-25.

* cited by examiner

*Primary Examiner* — Tom Y Lu
(74) *Attorney, Agent, or Firm* — Westman, Champlin & Kelly, P.A.

(57) ABSTRACT

The apparatus for registering face identification features can eliminate time and effort for manually retrieving and preparing face images by being provided with a face image retrieving portion 11 for retrieving a face image of a person via a network using the person's name as a keyword, a face feature extracting portion 12 for extracting features, which greatly influence identification of a person, from the face images retrieved by the face image retrieving portion 11, and a celebrity name, face image and feature database 13 for registering the face images retrieved by the face image retrieving portion 11 and the face features extracted by the face feature extracting portion 12 in a state where they are associated with the person's names.

19 Claims, 8 Drawing Sheets

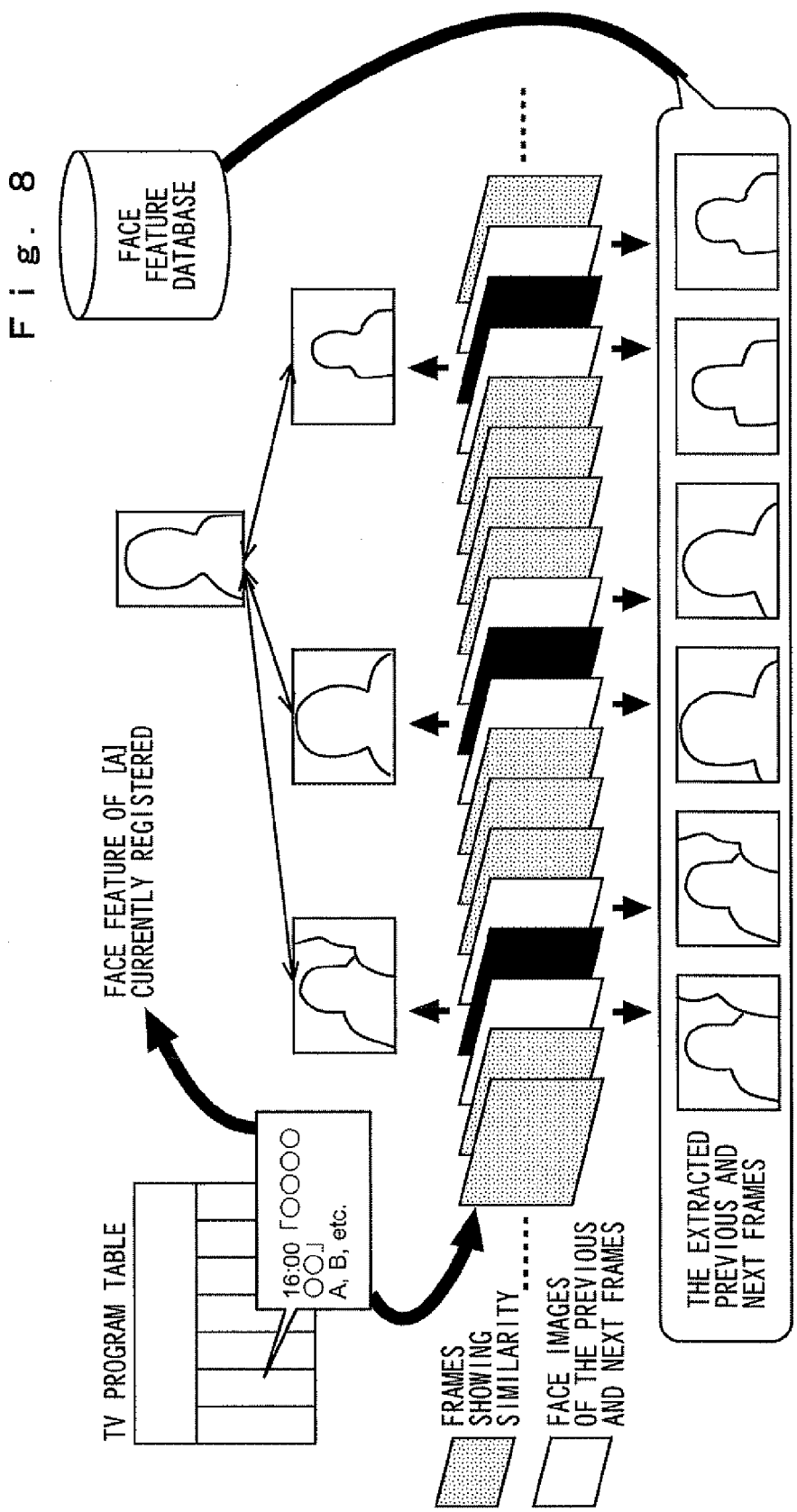

Fig. 9

ELECTRONIC TV PROGRAM TABLE

| | 1ch □□TV | 3ch □□TV | 4ch □□TV | 6ch □□TV | 8ch □□TV | 10ch □□TV | 12ch □□TV |
|---|---|---|---|---|---|---|---|
| 19 | 18:55 ○○○○○ | 19:00 ○○○○○ | 19:00 ○○○○○ | 18:55 ○○○○○ | 19:00 ○○○○○ | 17:30 ○○○○○ | 19:00 ○○○○○ |
| | | | ××××× ××××× | | | | |
| | | 19:45 ○○○○ | | | | | |
| | | 19:50 ○○○○ | 19:58 ○○○○ | | | | |
| 20 | | | ××××× ××××× | | | | |

8ch (CHANNEL)
TV
2008/08/13 19:00~19:57 (BROADCASTING DATE AND TIME)
○○○○○ (PROGRAM TITLE)
×××× ×××× ××××
1 2 3 4 5 6 (PROGRAM IDENTIFIERS)

Fig. 10

RECORDED PROGRAM INFORMATION DATABASE

| CHANNEL | TIME | PROGRAM TITLE | PERFORMER CELEBRITIES | IDENTIFIERS |
|---|---|---|---|---|
| 1ch | 2008/08/13 18:55~20:30 | ○○○○ | | --------- |
| 3ch | 2008/08/13 19:00~19:45 | ○○○○ | | --------- |
| 4ch | 2008/08/13 19:00~19:58 | ○○○ | ×××× ×××× ×××× ×××× | --------- |
| 6ch | 2008/08/13 18:55~20:54 | ○○○○○○ | ×××× ×××× | 1 2 3 4 5 6 |
| 8ch | 2008/08/13 19:00~19:57 | ○○○ | ×××× ×××× ×××× ×××× ×××× | --------- |
| 10ch | 2008/08/13 17:30~20:00 | ○○○ | ×××× ×××× | --------- |
| 12ch | 2008/08/13 19:00~20:55 | ○○○○ | ××××× ××××× ×× ×× ×××× ×××× × ××× | --------- |

APPARATUS FOR REGISTERING FACE IDENTIFICATION FEATURES, METHOD FOR REGISTERING THE SAME, PROGRAM FOR REGISTERING THE SAME, AND RECORDING MEDIUM

The present application is claims priority of Japanese Patent Application Serial No. 2008-236576, filed Sep. 16, 2008, the content of which is hereby incorporated by reference in its entirety.

BACKGROUND OF THE INVENTION

1. Field of the Invention

The present invention relates to an apparatus for registering face identification features, which automatically registers features for identification from face images retrieved by utilizing a network. In particular, the present invention relates to an apparatus for registering face identification features capable of efficiently registering face identification features of celebrities appearing on TV such as actors, models, artists, newscasters, etc., which is used to identify who a picked-up face image is when retrieving TV programs by face identification by being provided with a TV image recording device to accumulate and view TV images, a method for registering the same, and a program for registering the same to carry out the method for registering the same, and a recording medium in which the program for registering the same is recorded.

2. Description of the Related Art

Several apparatuses for identifying, based on faces, who a picked-up person is among registered persons have been proposed before. A person authentication apparatus and a person authentication method, which are disclosed in Patent Document 1, exist as a representative face identification apparatus.

Patent Document 1: Japanese Published Unexamined Patent Application No. H9-251534

As shown in FIG. 11, a face identification apparatus described in Patent Document 1 is composed of, as its basic portion, a feature extracting portion 91 for extracting a face feature, which greatly influences specifying a person, from a picked-up face image, a feature accumulating portion 92 that accumulates the feature extracted in advance by the feature extracting portion 91, a feature comparison portion 93 for calculating a similarity by comparison of the features registered in advance in the feature accumulating portion 92, and an identification portion 94 for specifying the person based on the similarity.

Generally, a face greatly changes in appearance due to fluctuation resulting from posture, lighting and facial expression. As a result, where an unknown fluctuation occurs, which is not included in the feature registered with respect to a picked-up face, such a case occurs that a deviation is brought about from the registered features and it becomes difficult to correctly identify the person.

In Patent Document 1 described above, in order to realize face identification capable of withstanding fluctuations, face images to which a plurality of fluctuations that may occur when registering a face are added are prepared in advance, and the features including the fluctuations are extracted.

Before carrying out identification of an unknown face, it is necessary to extract and register the features of a person to be identified in advance. This is not limited to the face identification apparatus according to Patent Document 1 described above, but is common to all the other face identification apparatuses. For example, in the case of identifying an appearing person by face for the purpose of retrieving TV programs, it is necessary to register the names of persons having the possibility of appearing on TV and their features in advance. A first problem exists which takes a great deal of time and effort where the names and face features of all celebrities appearing on TV are manually registered since a huge number of persons of approximately 15,000 persons such as actors, models, artists, newscasters, etc., are registered in the Japan Talent Directory.

Also, a second problem exists which requires preparation, in advance, of face images to which a plurality of fluctuations occurring in registration are added in order to achieve face identification capable of withstanding fluctuations and also causes difficulty for general viewers to collect face images of celebrities appearing on TV, causes difficulty for general viewers to collect at one time even if the collection itself is possible, and takes a great deal of time and effort.

Prior art face identification apparatuses including Patent Document 1 described above are not provided with any special measures with respect to the above-described two problems regarding registration of the features.

In addition, various unsolved problems still remain as a face identification apparatus. One problem that may be mentioned is that the identification accuracy is not sufficiently high. Therefore, the accuracy does not reach the level capable of identifying a face once the face image is picked up, wherein a problem actually occurs where a person cannot be identified just because the face direction is changed.

Accordingly, for the purpose of increasing the accuracy of face identification processing, various types of face feature registering technologies have been proposed.

For example, Patent Document 2 discloses a method for retrieving images, which is featured in including the steps of detecting frames having faces picked up therein from video images, extracting face images from the frames, grouping faces of the same persons that appear from all the extracted face images, and extracting the representative face image per appearing person.

According to the image retrieval method, detection specialized in faces is carried out with respect to video images, and detected faces are identified, wherein faces of persons appearing in video images can be distinguished and displayed.

Patent Document 3 discloses a person authentication apparatus including means for inputting image data to authenticate persons, frame by frame, means for detecting a face region from the image data, means for detecting a feature from the face region, means for determining by comparison of the feature with the reference value whether the feature is valid, means for storing a plurality of frames of features determined to be valid, means for obtaining an authentication feature by carrying out calculations on the plurality of frames of features, and means for authenticating the person by comparison of the authentication feature with the face features stored in advance.

According to the person authentication apparatus, it is possible to improve the measurement accuracy of features to determine valid frames while preventing the authentication accuracy from being lowered due to the posture of his or her head and influence of his or her facial expression.

Patent Document 4 discloses an authentication system including a face authentication database in which a plurality of face information obtained by picking up the face of an identical person to be authenticated under a plurality of different circumstances are registered in association with pattern names corresponding to the circumstances, an identical person specifying table in which the pattern names registered in the face authentication database and an identical person picked up with the pattern names are associated with each other, a camera for obtaining face information by picking up a face of a person to be authenticated, authentication processing means for specifying face information having the highest similarity by collating the face information picked up by the camera and a plurality of face information registered in the face authentication database with each other, means for specifying an identical person corresponding to the pattern name based on the identical person specifying table from the pattern names of the face information specified by the authentication processing means.

According to the authentication system, it is possible to correctly carry out authentication under any circumstances by preparing a plurality of face information under different circumstances.

Patent Document 5 pertains to a new registration apparatus for face image database for registering a new person in a person face image database and a face feature database, which is configured so as to include means for estimating the positions of a plurality of feature points in the face region of a person in an input image and the directions of the face of the person, means for selecting a frame, in which the face of the person shows a predetermined direction, from the input images in accordance with the face direction information estimated by the estimating means or the face direction information input from the outside, user interface means for displaying the frame selected by the selecting means and its associated information upon receiving a user instruction, and means for calculating database components of the person in the input images by measuring the face features of the person in the vicinity of the plurality of feature points, which are estimated by the estimating means, in the frame selected by the selecting means.

According to the new registration apparatus for face image database, database registration work of new persons can be automated.

Patent Document 6 discloses a face image registering apparatus that is configured so as to include a scene extracting portion for extracting a scene, in which the face image of at least one person is continuously picked up, from input video images, a representative face image extracting portion for extracting an image of a face turned straight ahead from the extracted scene, a registration face image extracting portion for extracting various types of registration face images matching the pick-up condition of other face images in association with the person expressed by the extracted front face image from the scene, and a face image registration portion for registering the extracted representative face images and the extracted registration face images in a face image dictionary in a state where they are associated with each other.

According to the face image registration apparatus, various face images that can be utilized for authentication processing can be registered in a dictionary without giving time and effort to a user.

Patent Document 2: Japanese Published Unexamined Patent Application No. 2001-167110
Patent Document 3: Japanese Published Unexamined Patent Application No. H6-259534
Patent Document 4: Japanese Published Unexamined Patent Application No. 2005-115481
Patent Document 5: Japanese Published Unexamined Patent Application No. 2002-133423
Patent Document 6: Japanese Published Unexamined Patent Application No. 2007-249588

In an authentication apparatus using face images, it is necessary to register face images picked up under various conditions in order to improve the authentication performance. However, work for manually selecting images suitable for registration from a number of still images and registering the same is cumbersome and difficult.

Also, the technology described in Patent Document 2 only groups the faces of the same appearing person and is not devised in that the grouped faces are registered in a database.

The technology described in Patent Document 3 only improves the measurement accuracy of the feature to determine valid frames and is not devised in that the measured feature is registered in a database.

With the technology described in Patent Document 4, it is necessary for a user to prepare face information under different circumstances in advance, and a problem occurs by which unnecessary time and effort are brought to the user.

The technology described in Patent Document 5 only estimates the positions of the feature points in respective frames of input materials, wherein final determination is up to a user. Therefore, a problem occurs by which unnecessary time and effort are brought to the user.

Although the technology described in Patent Document 6 provides means for newly registering face features, no attention is paid to updating of the registered features of persons already registered.

In addition, the technology described in Patent Document 6 only registers a plurality of features in association with the face photographs, wherein no attention is paid with respect to registering a plurality of features and names of persons in association with each other.

As described above, by utilizing the prior arts, it is difficult to cover a plurality of face images required for an authentication apparatus in advance, wherein a problem is brought about by which it takes a great deal of time and effort in view of manual registration of various face features by a user.

SUMMARY OF THE INVENTION

The present invention was developed in view of the above-described situations, and it is therefore an object of the present invention to provide an apparatus for registering face identification features, which is capable of efficiently registering and managing face features from information of face images by obtaining information of face images of persons from data, in which person's names and face images are associated with each other, via a network, a method for registering face identification features, a program for registering face identification features, by which the method for registering face identification features is carried out, and a recording medium having a program for registering face identification features recorded therein.

In order to solve the first problem described above, a first aspect of the apparatus for registering face identification features according to the present invention exists in a configuration by which time and effort of manually retrieving and preparing face images can be omitted by acquiring a face image of a person (for example, a celebrity appearing on TV) via a network through image retrieval using a person's name (celebrity name) as a keyword when registering face features of the face image of the person (celebrity), and by registering the same in a database (Initial registration of face image).

Also, in order to solve the second problem described above, a second aspect of the apparatus for registering face identification features according to the present invention exists in a configuration that selects a face having a high degree of similarity to features currently registered based on continuity of video images supplied through a network or from TV program images, determines that a face appearing at the same peripheral positions of the previous and next frames is the face of the same person, and newly and additionally register the face image in a database (Updating registration of face images).

A video image supplied from a network means an image supplied, in which a person's name and an image are associated with each other, and for example, it includes a video image picked up by an individual.

A video image supplied from a TV program image means a video image based on TV program images which are obtained by receiving TV broadcasting waves.

Further, a third aspect exists in a configuration that achieves the composing means, which are listed as the first aspect and the second aspect described above, on a TV program image recording apparatus including means for acquiring an electronic TV program table (Framing of automation).

Namely, the configuration of the first feature portion of the apparatus for registering face identification features (Claim 1), comprises, a face image retrieving portion for retrieving a face image of a person via a network using the person's name as a keyword, a face feature extracting portion for extracting features, which greatly influence identification of a person, from the face image retrieved by the face image retrieving portion; and a person's name, face image and feature database for registering the face image retrieved by the face image retrieving portion and the face feature extracted by the face feature extracting portion in a state where they are associated with the person's name.

The present invention of the Claim 2 is the apparatus for registering face identification features according to Claim 1, wherein the face image retrieving portion includes an image retrieving portion for retrieving images via a network based on a retrieval keyword; and a face detecting portion for detecting a region, in which a face exists, from the image retrieved by the image retrieving portion, and the face image retrieving portion is devised so as to retrieve only images, in which a face is correctly included, by outputting a face image only where the face is detected from the images retrieved by the detection portion.

The present invention of the Claim 3 is the apparatus for registering face identification features according to Claim 2, wherein the face detecting portion includes re-retrieval notifying means for notifying a re-retrieval request from the face detecting portion to the image retrieving portion where no face is detected from the images retrieved by the image retrieving portion.

The present invention of the Claim 4 is the apparatus for registering face identification features according to Claims 1, further including a celebrity name extracting portion for extracting a celebrity name described in a list of performers of respective TV programs from an electronic TV program table acquired by receiving and separating TV broadcasting waves or an electronic TV program table acquired via a network, wherein the face image retrieving portion is configured so as to retrieve face images of a celebrity name via the network using the celebrity name, which is extracted by the celebrity name extracting portion, as a retrieval keyword.

The present invention of the Claim 5 is an apparatus for registering face identification features, comprising, a face image retrieving portion for retrieving a face image of a person via a network using the person's name as a keyword, a face feature extracting portion for extracting features, which greatly influence identification of a person, from the face image retrieved by the face image retrieving portion, a person's name, face image and feature database for registering the face image retrieved by the face image retrieving portion and the face feature extracted by the face feature extracting portion in a state where they are associated with the person's name, an image receiving portion for video images via a network, a normalized face image extracting portion for extracting a normalized face image from face images by the unit of frame image having a face appearing thereon using the video image as input with respect to a person's name designated by the person's name, face image and feature database, a face similarity calculating portion for calculating a similarity between the feature extracted by the normalized face image extracting portion and the feature of the person designated by the person's name, face image and feature database, a face tracking portion for detecting a face from the video images frame by frame, determining identity of a person based on continuity of video images from the relationship between frames of positions of the face region obtained as a result of face detection, and specifying the zone in which the same person appears, and an additional face image extracting portion for specifying frames showing similarity exceeding a threshold value in the appearing zone of a specified person, and extracting face images of the previous and next frames thereof as additional faces, and wherein the face feature extracting portion extracts the feature from the additional image of the additional face image extracting portion and re-registers the feature of the additional image in the person's name, face image and feature database as an image of a person's name designated in the person's name, face image and feature database.

The present invention of the Claim 6 is the configuration of the second feature portion of an apparatus for registering face identification features, comprises a face image retrieving portion for retrieving a face image of a person via a network using the person's name as a keyword, a face feature extracting portion for extracting features, which greatly influence identification of a person, from the face image retrieved by the face image retrieving portion, a person's name, face image and feature database for registering the face image retrieved by the face image retrieving portion and the face feature extracted by the face feature extracting portion in a state where they are associated with the person's name, a TV broadcasting wave receiving portion for receiving TV broadcasting waves and separating the same into TV program images and an electronic TV program table, a normalized face image extracting portion for extracting a normalized face image from face images by the unit of frame image having a face appearing thereon using the TV program images as input, a face similarity calculating portion for calculating similarity between the feature extracted by the normalized face image extracting portion and the feature of persons registered in the person's name, face image and feature database, a face tracking portion for detecting a face from the TV program images frame by frame, determining identity of a person based on continuity of video images from the relationship between frames of positions of the face region obtained as a result of face detection, and specifying the zone in which the same person appears, and an additional face image extracting portion for specifying frames showing similarity exceeding a threshold value in the appearing zone of a specified person, and extracting face images of the previous and next frames thereof as additional faces, and wherein the face feature extracting portion extracts the feature from the additional image of the additional face image extracting portion and re-registers the feature of the additional image in the person's name, face image and feature database as an image of a person's name in the person's name, face image and feature database.

The present invention of the Claim 7 is the apparatus for registering face identification features according to Claim 6, wherein the face similarity calculating portion includes means for narrowing down objects to be identified based on the names of performers of the electronic TV program table.

The present inventions of the Claim 8 and 9 are the configuration of the third feature portion of the apparatus for registering face identification features according to Claim 6 or 7, further includes, a recording portion for converting TV program images separated by the TV broadcasting wave receiving portion to a format in which the TV program images can be accumulated in a recording medium, a recorded program information extracting portion for extracting a program title, broadcasting date and time, channel, genre, a list of performer celebrities, and a program identifier regarding a TV program, which becomes an object to be recorded, from the electronic TV program table obtained by the TV broadcasting wave receiving portion or via a network as program information, and further generating a unique program identifier to identify respective programs from the program information, a recorded program information database for causing a program title, broadcasting date and time, channel, genre, a list of performer celebrities, and a program identifier regarding recorded TV programs extracted by the recorded program information extracting portion to be associated with each other and registering the same therein as program information, a video image database for causing file names generated based on the program identifier generated by the recorded program information extracting portion to be associated with TV program images converted by the recording portion and accumulating the same therein, a selection program information extracting portion for extracting a program identifier regarding a selected TV program and a list of names of celebrities appearing on the program from the program information registered in the recorded program information database, and a reproduction portion for reading a TV program image carrying the file name based on the program identifier generated by the selection program information extracting portion and reproducing the same.

The present inventions of the Claim 10 and 11 are the apparatus for registering face identification features according to Claim 8 or 9, further including a meta-information giving portion that gives information such as names of appearing celebrities, and appearing zones of the same person, which is secondarily obtained by the face similarity calculating portion and the face tracking portion to the program information of the corresponding TV program registered in the recorded program information database as meta-information.

The present invention of the Claim 12 is a method for registering face identification features, comprising the steps of retrieving face images of a person via a network using the person's name as a keyword, extracting the features, which greatly influence identification of persons, from the face images retrieved by the face image retrieving portion, and registering the face images retrieved in the face image retrieving step and the face features extracted in the face feature extracting step in the person's name, face image and feature database in a state where they are associated with the person's name.

The present invention of the Claim 13 is a program for registering face identification features capable of executing the respective steps of the method for registering face identification features according to Claim 12 by a computer.

The present invention of the Claim 14 is a recording medium, readable by a computer, in which the program for registering face identification features according to Claim 13 is stored.

According to the configuration of the first feature portion of the apparatus for registering face identification features, face images of the corresponding the person (celebrity) are obtained via a network through image retrieval using, as the keyword a person's name (celebrity name) and maybe registered in the database. Therefore, when registering the features of the face images of the person (an actor, an actress, a model an artist a caster, etc. a celebrity appearing on TV, individual which a person's name and an image associated with each other in a blog), the load can be relieved, and the registration can be efficiently carried out.

According to the configuration of the second feature portion of the apparatus for registering face identification features, there is a high possibility for fluctuation elements not included in the registered features up to then to be added in the face images appearing in the previous and next frames of the frame determined to have similarity, features having a high degree of expressive power, which controls the fluctuation, can be registered from time to time by using these face images, and highly accurate face identification can be achieved.

According to the configuration of the third feature portion of the apparatus for registering face identification features, it becomes possible to construct an environment in which TV program images becoming inputs and the names of celebrities appearing thereon are provided day by day in a state where they are associated with each other. And the above-described function can be used to re-register the latest face images of celebrities, it becomes possible to prepare the features that prevent chronological fluctuations.

As a result, in TV image recording device to accumulate and view, it is possible to acquire high precision about specifying or referring scene which is appeared performer in the program.

In addition according to a method for registering face identification features, it is possible to acquire a face image of a person via a network through image retrieval using a person's name (celebrity name) as a keyword when registering face features of the face image of the person (celebrity), and by registering the same in a database by executing the respective steps.

And according to a program for registering the face identification features and a recording medium in which the program for registering face identification features is recorded, it is possible to carry out the respective steps of the method for registering the face identification features.

BRIEF DESCRIPTION OF THE DRAWINGS

FIG. 8 is a schematic view describing a procedure of extracting additional images based on continuity of TV program images;

FIG. 9 is a schematic view showing electronic TV programs registered in a recorded program information database of the apparatus for registering face identification features;

FIG. 10 is a schematic view with respect to program information obtained from the electronic TV program table.

DETAILED DESCRIPTION OF THE PREFERRED EMBODIMENT

Figure 1:
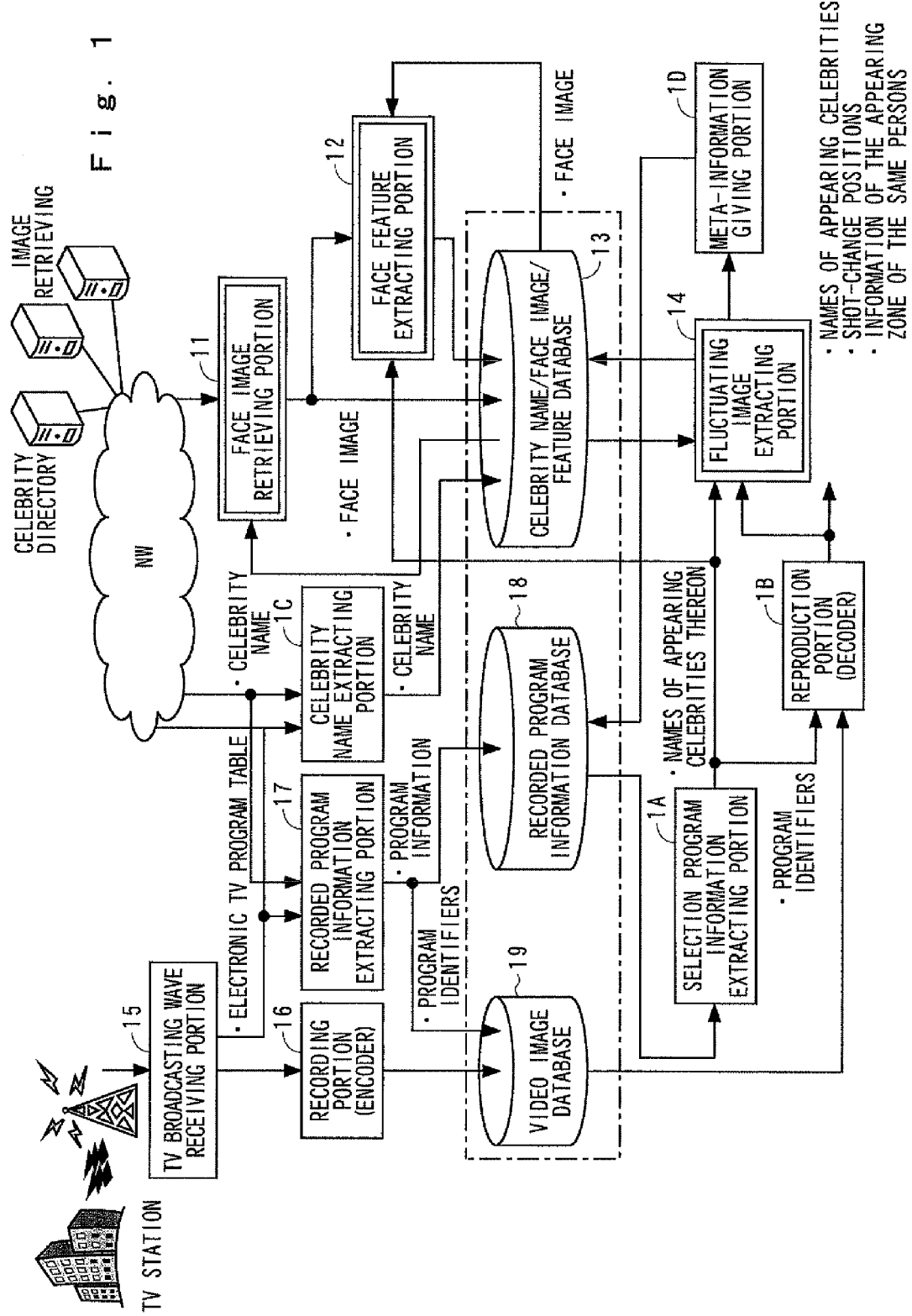
FIG. 1 is a block diagram showing a configuration of an apparatus for registering face identification features as an example of an embodiment of the present invention.

Hereinafter, a detailed description is given of one example of the best mode for carrying out the present invention with reference to the drawings. FIG. 1 is a block diagram showing the entire configuration of an apparatus for registering face identification features of the present invention. The apparatus for registering face identification features includes the first feature portion (initial registration of face images), the second feature portion (updating registration of face images) and the third feature portion (framing of automation) in the configuration thereof.

The apparatus for registering face identification features is configured so as to include a selection program information extracting portion 1A for selecting one recorded program from program information registered in a recorded program information database 18 described later and extracting program information such as names of appearing celebrities and program identifier, etc., a reproduction portion 1B for reading TV program images based on the program identifier extracted by the selection program information extracting portion 1A from a video image database 19 described later and reproducing the TV program images frame by frame, a celebrity name extracting portion 1C for extracting a celebrity name from an electronic TV program table, and a meta-information giving portion 1D for giving various types of program information to TV programs registered in the recorded program information database 18 as meta-information.

The first feature portion of the apparatus for registering face identification features is composed, as shown in FIG. 1, of a face image retrieving portion 11, a face feature extracting portion 12, a celebrity name/face image/feature database 13, and a celebrity name extracting portion 1C. The apparatus for registering face identification features is connected to a network via a provider.

The face image retrieving portion 11 retrieves a face image of a person (celebrity) via a network using a person's name (for example, celebrity name) as a retrieval keyword. An image similar to image retrieval as, for example, Google (Trademark of Google, Inc.) may be assumed as the retrieving method. That is, meta-information based on text is given to image files accumulated in a server on a network by a certain method, and images to which meta-information identical to or similar to the keyword entered for image retrieval is given are obtained as the retrieval result.

Figure 2:
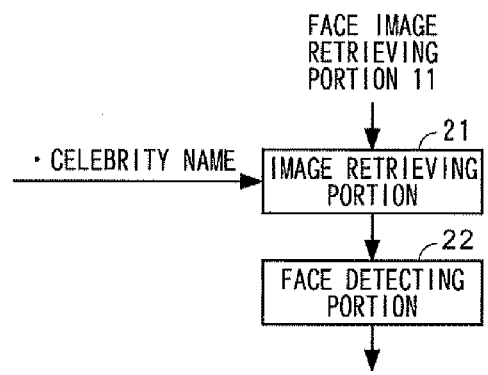
FIG. 2 is a block diagram showing a detailed configuration of a face image retrieving portion in the apparatus for registering face identification features.

As shown in FIG. 2, the face image retrieving portion 11 is composed of an image retrieving portion 21 for retrieving images via the network using a person's name (celebrity name) as a keyword and a face detecting portion 22 for detecting a face region from the images. In this case, a person's name (celebrity name) entered in the image retrieving portion 21 may be automatically entered from the celebrity name extracting portion 1C or may be entered by, for example, operation of a keyboard.

Where a face image is obtained via the network, unless a server managed like a celebrity directory is available, it is not always the case that correct celebrity names are given to the face images of celebrity as meta-information. Of these, there are images having no face picked up although a correct celebrity name is given to the face image of the celebrity as meta-information. To cope with such a situation, by determining whether or not the retrieved image is a face image in the face detecting portion 22, only the image having a face picked up is output to the face feature detecting portion 12 of the next stage, and a process for preparing the features in the face feature detecting portion 12 of the next stage from the image having no face picked up is prevented from being carried out.

The face detecting portion 22 takes in a picked-up image, detects the face region included in the picked-up image as a face image, and outputs the coordinates of the existence position and the size thereof. In the present embodiment, where the face region is defined as rectangular based on a publicly known face image detection method described in Non-Patent Document 1, the upper left coordinates (fx, fy) of the face region are output as the position coordinates, and the width fw and the height fh are output as the size.

Non-Patent Document 1: P. Viola, M. J. Jones, "Robust real-time object detection," in: Second International Workshop on Theories of Visual Modeling, Learning, Computing, and Sampling, 2001.

In addition, by the face detecting portion 22 being provided with re-retrieval notifying means (not illustrated), where no face is found in a retrieved image, a re-retrieval request is notified from the face detecting portion 22 to the face image retrieving portion 11, and image retrieval is requested again in the image retrieving portion 21. By searching for a face by an algorithm of face image retrieval, which is different from the last time, in the re-retrieval by the face image retrieving portion 11, the possibility for obtaining information of face image is increased.

The apparatus for registering face identification features is provided with a TV broadcasting wave receiving portion 15, wherein an electronic TV program table acquired by receiving and separating the TV broadcasting waves by the TV broadcasting wave receiving portion 15 and an electronic TV program table supplied via a network are input in the celebrity name extracting portion 1C. The celebrity name extracting portion 1C is devised so as to extract celebrity names described in a list of performers of respective TV programs from the electronic TV program table.

Figure 3:
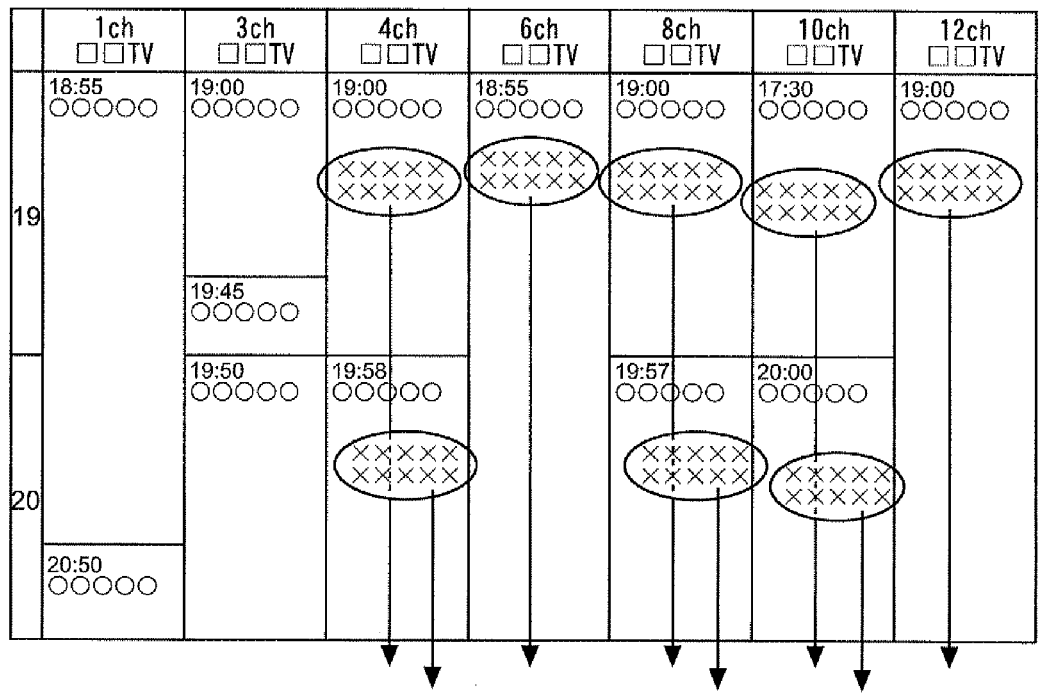
FIG. 3 is a schematic view showing an electronic TV program table used in the apparatus for registering face identification features.

As schematically shown in FIG. 3, in the electronic TV program table, the vertical lines show program information per hour and the horizontal lines show program information per channel. Since program title [OOOO] and list [XXXX] of performers are described in program information of respective TV program information, the celebrity name extracting portion 1C extracts celebrity names from the list of performers.

By a celebrity name used in the face image retrieving portion 11 (the image retrieving portion 21 in FIG. 2) as a keyword being automatically obtained from the electronic TV program table by the celebrity name extracting portion 1C, load of manually acquiring a celebrity name by entering the name by a keyboard can be omitted, and simultaneously, an earlier response can be taken for registration of a new personality in the entertainment world.

Where a face image corresponding to a person's name (celebrity name) is obtained in the face image retrieving portion 11 (image retrieving portion 21 and face detecting portion 22) via a network, the face image is output to the face feature extracting portion 12 wherein the extracting process of the features is carried out.

Figure 4:
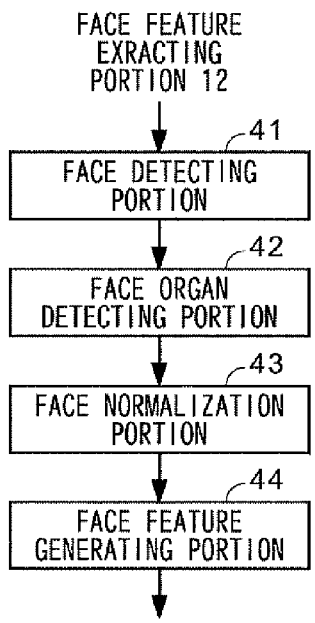
FIG. 4 is a block diagram showing a detailed configuration of a face feature extracting portion in the apparatus for registering face identification features.

As shown in FIG. 4, in order to extract the features, which greatly influence identification of persons, from the face image, the face feature extracting portion 12 is composed of a face detecting portion 41 for detecting a region, in which a face exists, from the image, a face organ extracting portion 42 for extracting a face organ from the detected face region, a face normalization portion 43 for obtaining a normalized face image by cutting out a face region based on the organ of the extracted face, and normalizing the face so that the face direction and size become constant, and a face feature generating portion 44 for generating the features, which greatly influence identification of a person, from one or more normalized face images.

The face organs extracted by the face organ extracting portion 42 are both pupils. The features of a face are determined based on a method for recognizing pupil images described in Patent Document 7 already filed by the inventor of the present application, that is, the position coordinates (Rx, Ry) of the right pupil and the position coordinates (Lx, Ly) of the left pupil are output, and the face region is determined based on the same data.

Patent Document 7: Japanese Patent Application No. 2008-181346

In the face normalization portion 43, the cut-out position of a face is determined based on the reference points of both pupils detected since the appearance size of the face and the direction thereof fluctuate, the face image cut out from the cut-out position is normalized so that the size thereof (the number of pixels) becomes constant.

Figure 5:
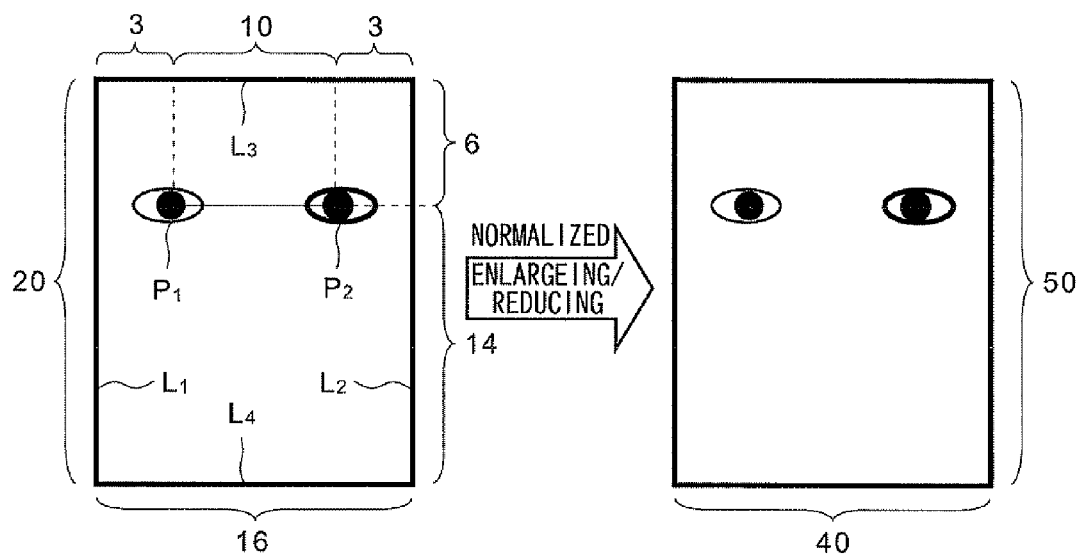
FIG. 5 is a schematic view describing normalization of faces.

In the present embodiment, as shown in FIG. 5, an image region of 16:20 is determined as the face cut-out region in such a manner that the distance between the coordinates (Rx, Ry) and (Lx, Ly) of both pupils P1, P2 detected above is [10] respective perpendicular lines at distance [3] from the pupils in the left and right directions are determined to be left and right profiles L1, L2 of the face region, the horizontal line at distance [6] in the upper direction from the pupils is determined to be the upper profile L3 of the face region, and the horizontal line at distance [14] in the downward direction from the pupils is determined to the lower profile L4 of the face region. By enlarging and reducing the face image so as for the number of pixels of the cut-out region to become 40×50 after the cut-out region of the face is determined, the face image is normalized, and the normalized data (normalized face image) is output to the face feature generating portion 44.

The face feature generating portion 44 generates the face features, which greatly influence identification of a person, from one or more normalized face images.

In the present embodiment, the features, which greatly influence identification of a person, are generated from a plurality of normalized face images including fluctuations by means of a subspace method described in Patent Document 7 described above. That is, considering a normalized face image as one of the vectors, subspace in which a plurality of normalized face images are distributed is extracted as features, and the degree of belonging to the subspace with respect to unknown normalized face images is calculated as a similarity when identifying the normalized face images.

In the face identification based on the subspace method, the face is identified to be a person in a subspace having a high degree of belonging, that is, having a large similarity. In detail, in order to reduce the accumulation capacity of the features, the subspace is not directly registered as features but N eigenvectors $e_1, e_2, \ldots, e_N$ that produce the subspace are registered as the features. These eigenvectors are obtained by first calculating an autocorrelation matrix from the set of normalized images and by developing an eigenvalue or an eigenvector from the autocorrelation matrix. The similarity S between the subspace and unknown normalized face images f may be calculated by the following expression (Mathematical expression 1).

$$S = \sum_{i=1}^{N} \frac{(f, e_i)^2}{|f|^2 |e_i|^2}$$ [Mathematical expression 1]

However, numerators $(f, e_i)$ are inner products of unknown normalized face images f and eigenvectors $e_i$ that produce a subspace, and $|f|$ and $|e_i|$ are sizes of respective f and $e_i$, wherein $0 \leq S \leq 1$ is established.

In the celebrity name, face image and feature database 13 (FIG. 1), face images retrieved by the face image retrieving portion 11 and face features extracted by the face feature extracting portion 12 (face features prepared by the face feature generating portion 44) are registered in association with the celebrity names acquired in the celebrity name extracting portion 1C.

According to the configuration of the first feature portion (initial registration of face images) of the apparatus for registering face identification features, face images of the corresponding celebrities are obtained via a network through image retrieval using, as the keyword, the celebrity names entered by operating a keyboard and the celebrity names automatically obtained from the electronic TV program table by the celebrity name extracting portion 1C, and may be registered in the celebrity name, face image and feature database 13. Therefore, when registering the features of the face images of celebrities, the load can be relieved, and the registration can be efficiently carried out.

Although, in the example described above, a description was given of registration of face images of celebrities as an example, it is possible to register images of not only celebrities such as actors, models, artists, newscasters, etc., but also persons the images of which can be acquired from a homepage and a blog even if persons are private individuals as long as the person's names and face images are associated with each other on a network.

Next, a description is given of the configuration of the second feature portion (updating registration of face images) of the apparatus for registering face identification features in FIG. 1.

The second feature portion (updating registration of face images) is composed of a face feature extracting portion 12, a celebrity name, face image and feature database 13 and a fluctuating image extracting portion 14.

The fluctuating image extracting portion 14 extracts face images to which fluctuations not included in already registered features are added, based on continuity of video images while inputting TV program images associated with the names of appearing celebrities by means of a reproduction portion (decoder) 1B, and additionally registers the same in the celebrity name, face image and feature database 13.

At the same time, the face feature extracting portion 12 newly extracts features, which greatly influence identification of celebrities appearing on TV program images, from the face images, to which fluctuations are added, input from the reproduction portion (decoder) 1B via the celebrity name, face image and feature database 13, and also re-registers the features in the celebrity name, face image and feature database 13.

Figure 6:
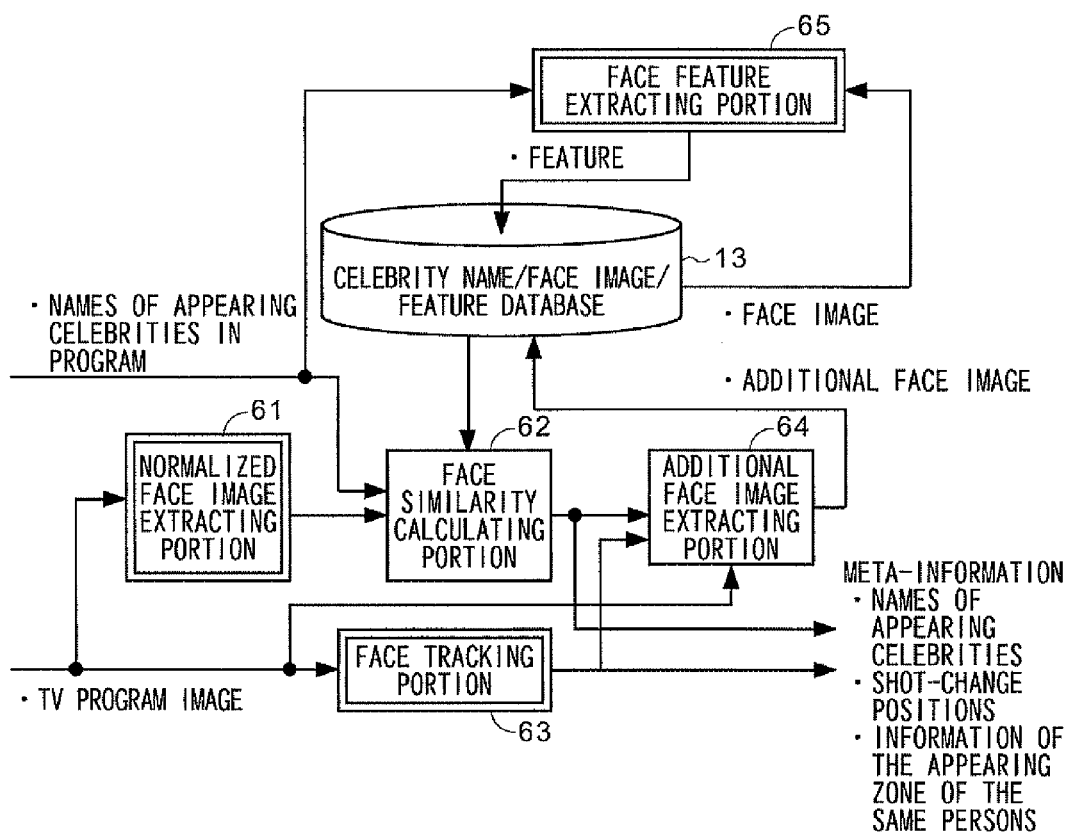
FIG. 6 is a block diagram showing a detailed configuration of a fluctuating image extracting portion in the apparatus for registering face identification features.

A description is given of a detailed configuration to carry out updating registration of face images in the apparatus for registering face identification features with reference to FIG. 6.

The configuration for updating registration of face images is provided with a normalized face image extracting portion 61, a face similarity calculating portion 62, a face tracking portion 63, an additional face image extracting portion 64, a face feature extracting portion 65 and a celebrity name, face image and feature database 13.

The normalized face image extracting portion 61 is such that the face feature generating portion 44 is omitted from the functional block diagram (FIG. 4) of the face feature extracting portion 12 described in FIG. 1. The normalized face image extracting portion 61 is composed of a face detecting portion 41 for detecting a region where a face exists in an image, a face organ extracting portion 42 for extracting a face organ in the detected face region, and a face normalizing portion 43 for obtaining a normalized face image by cutting out a face region based on the organ of the extracted face and normalizing the same so that the face direction and size become constant, and the normalized face image extracting portion 61 is devised so that a normalized face image is extracted from face images by the unit of frame image, in which a face appears, using TV program images as inputs.

The face similarity calculating portion 62 compares normalized face images of an unknown person, which are extracted by the normalized face image extracting portion 61, with the features of celebrities registered in the celebrity name, face image and feature database 13, and calculates the similarity score with respect to the face features of respective celebrities, using the mathematical expression (1) described above.

At this time, a lowering in probability of erroneous identification is carried out by automatically acquiring celebrity names appearing on programs from the program information, etc., and narrowing down celebrities, who become objects to be identified, by narrowing-down means. For example, where TV program images for which association with the program information has been secured are used as input, comparison of celebrities who are considered not to appear on the current TV program based on the contents described in the list of performers is not required.

Describing in detail, where celebrities appearing on the input TV program are two persons A and B, comparison of normalized face images of unknown persons with the face features is carried out with the object person limited to these two celebrities. In this case, similarities to the face features of A and B are, respectively, calculated by the unit of image frame in which faces of the input TV program images appear.

The face tracking portion 63 detects faces frame by frame from the input TV program images, determines the identity of a person based on continuity of video images based on the relationship between the frames of the positions of face regions obtained as a result of face detection, and specifies the zone during which the same person appears. Since the functions based on the face tracking portion 63 are the same as in the "face index producing apparatus of the video image and face image tracking method thereof" proposed by the inventor of the present invention and disclosed in Patent Document 8, only the outline thereof will be described.

Patent Document 8: Japanese Patent Application No. 2007-78728

That is, the face tracking portion 63 reads video images from TV program images one after another frame by frame, tracks face images of the same person continuously appearing over a plurality of frames, and specifies the zone during which the person continuously appears.

Figure 7:
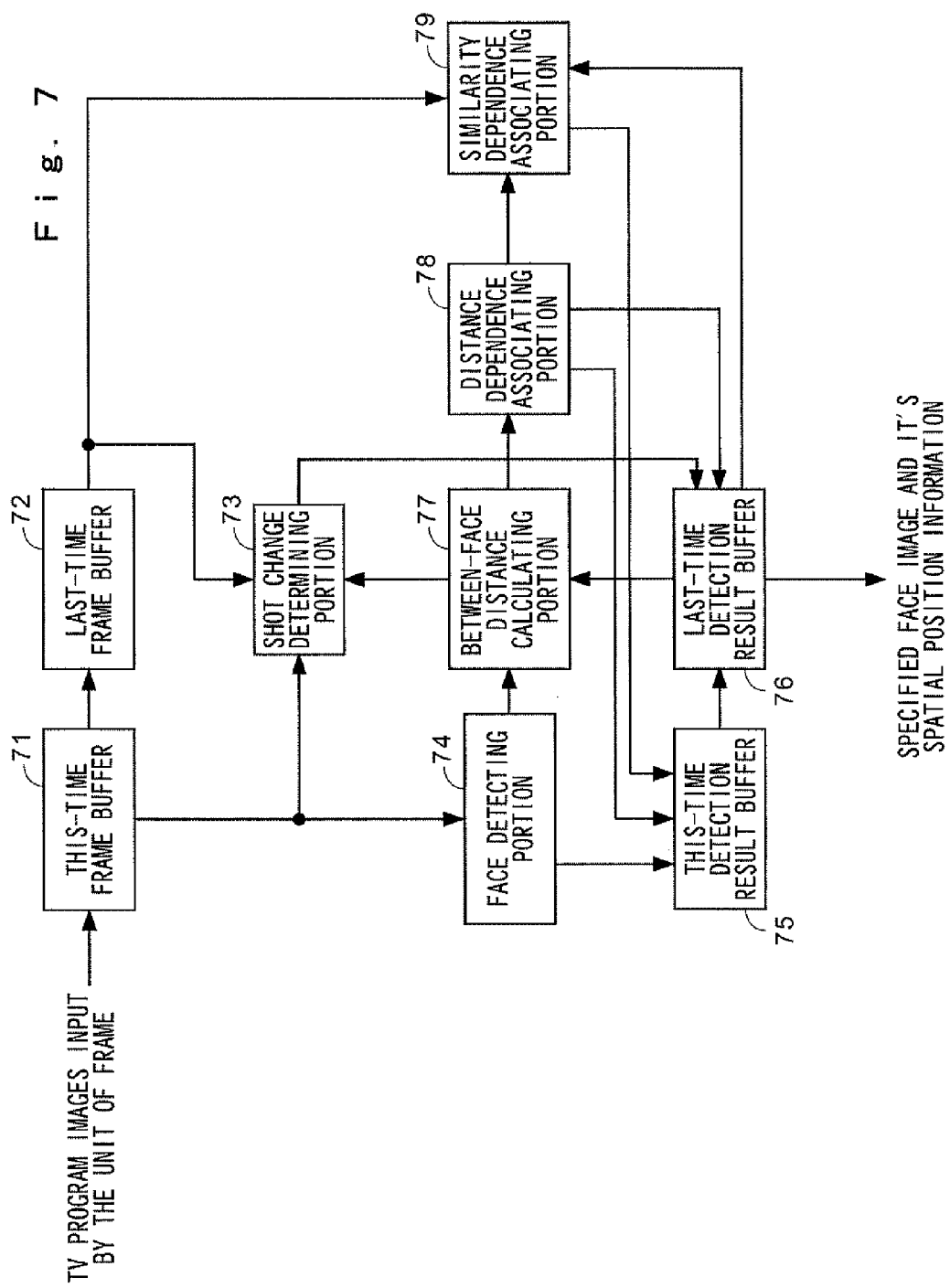
FIG. 7 is a block diagram showing a detailed configuration of an additional image extracting portion in the apparatus for registering face identification features.
Figure 11:
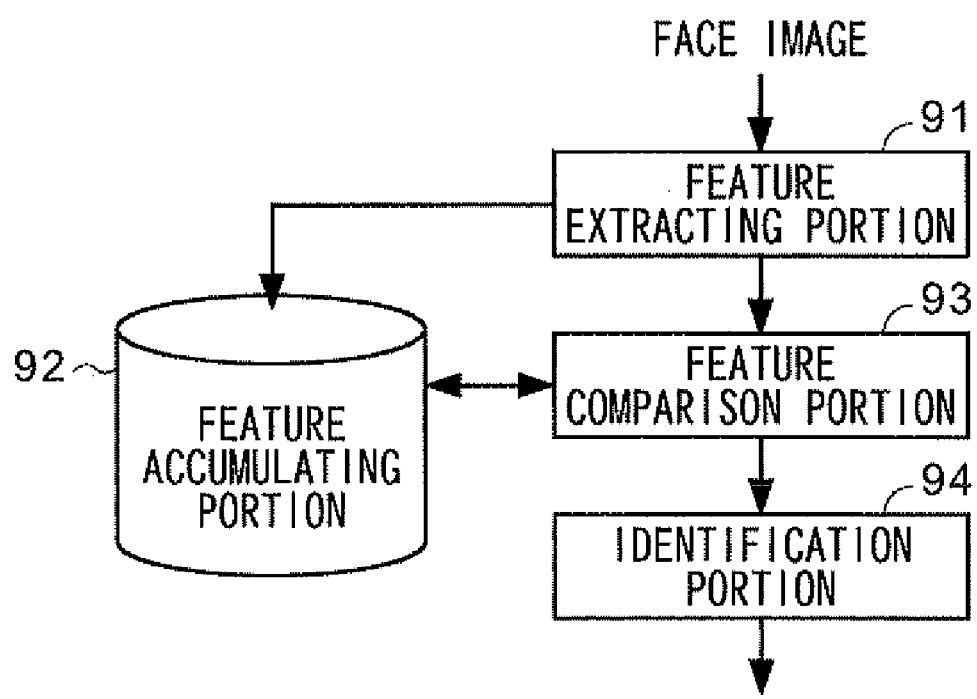
FIG. 11 is a block diagram showing a configuration of a prior art face identification apparatus.

FIG. 7 is a block diagram functionally expressing the face tracking portion 63 of FIG. 6. The face tracking portion 63 is provided with a this-time frame buffer 71, a last-time frame buffer 72, a shot change determining portion 73, a face detecting portion 74, a this-time detection result buffer 75, a last-time detection result buffer 76, a between-face distance calculating portion 77, a distance dependence associating portion 78 and a similarity dependence associating portion 79.

The this-time frame buffer 71 reads still images equivalent to one frame from TV program images input by the unit of frame at an optional time interval and accumulates still images of this-time frame read this time. The last-time frame buffer 72 accumulates still images of the last-time frame read at the last time. The shot change determining portion 73 compares the still images accumulated in the this-time frame buffer 71 and the last-time frame buffer with each other, and distinguishes whether or not there is any camera editing point between shots based on the similarity.

The face detecting portion 74 detects face images from the still images of the this-time frame, which are accumulated in the this-time frame buffer 71, and obtains spatial position information such as position coordinates, width, height, etc., of the display range for each of the detected face images.

The this-time detection result buffer 75 accumulates position information of the face images obtained by the face detecting portion 74. Also, it is assumed that the face image immediately after being detected by the face detecting portion 74 is handled as an unspecified face candidate and is handled as a specified face when the face image is detected at the same display position in the next frame. In addition, the last-time detection result buffer 76 accumulates spatial position information such as position coordinates, width, height, etc., of the display range of face candidate and specified face, which are detected in the last-time frame.

The between-face distance calculating portion 77 calculates the distance $\Delta d$ between the display position of respective face images of the this-time frame, which are accumulated in the this-time detection result buffer 75, and the display position of respective face images of the last-time frame, which are accumulated in the last-time detection result buffer 76 (hereinafter called a "between-face distance"). The distance $\Delta d$ may be obtained by, for example, calculating the distance between the upper left coordinates of the respective face images.

The distance dependence associating portion 78 updates a status of a face candidate detected in the this-time frame to a specified face in the this-time detection result buffer 75 with respect to combinations of face images (face candidate and specified face) for which the between-face distance $\Delta d$ calculated in the between-face distance calculating portion 77 is lower than a predetermined threshold value $\Delta d$ ref. Simultaneously, the distance dependence associating portion 78 updates the status of a face candidate detected in the last-time frame to a specified face in the last-time detection result buffer 76, and further causes the respective face images to be associated with each other as a face image series. Here, it is preferable that the predetermined threshold value $\Delta d$ ref is set to a value proportionate to the size of the face image detected in the last-time frame.

The similarity dependence associating portion 79 carries out template matching in the images of the this-time frame, using specified faces not associated with any one of the face images in the this-time frame among the specified faces of the last-time frame accumulated in the last-time detection result buffer 76 as templates, adds images in regions, for which the similarity exceeds a predetermined threshold value, to the this-time detection result buffer 75 as new face images (specified faces), and causes the respective face images to be associated with each other as a face image series. It is preferable that, in order to reduce erroneous detection in the template matching and to reduce the amount of calculation, the region to which template matching is applied is not determined at the entire images of the this-time frame but is determined at positions corresponding to the display position in the last-time frame of specified faces used as the template and the vicinity thereof.

Finally, the specified face images and the region coordinates are retained and output to the last-time detection result buffer 76.

The additional face image extracting portion 64 (FIG. 6) specifies the frames showing a similarity exceeding the threshold value of celebrities appearing on a program in the appearing zone of a specified celebrity, along with the celebrity name, and extracts the face images in the previous and next frames as additional face images.

A description is given of an example of extracting additional face images with reference to FIG. 8. Video images with respect to celebrity name [A] extracted from the TV program table are read one after another frame by frame, and frames (three frames displayed in black in FIG. 8) in which faces having a high degree of similarity to the features of [A] currently registered exist are selected based on continuity of the video images, wherein the previous and next frames of the frames displayed in black (in this example, six frames in all) are extracted as additional images by determining that the faces appearing at the same peripheral positions of the previous and next frames of the same are the faces of the same person.

The extracted additional images are registered in the specified celebrity name, face image and feature database 13. It is considered that, since the face images appearing in the previous and next frames are face images not showing a high degree of similarity to the features up to now, there is a high possibility for fluctuations, which are not included in the features registered up to now, to be probably included.

The face feature extracting portion 65 (FIG. 6) extracts the features of the name of a celebrity appearing on a program from the face images registered in the celebrity name, face image and feature database 13 as in the face feature extracting portion 12 described in FIG. 1, and re-registers the face features in the celebrity name, face image and feature database 13.

According to the second feature portion (automatic updating of face image) of the apparatus for registering face identification features, the frame showing similarity in an appearing zone of a specified celebrity and the name of the celebrity are specified using the images from TV program images, the face images of the previous and next frames are extracted by the additional face image extracting portion 64 as additional face images and are registered in the celebrity name, face image and feature database 13. Therefore, since there is a high possibility for fluctuation elements not included in the registered features up to then to be added in the face images appearing in the previous and next frames of the frame determined to have similarity, features having a high degree of expressive power, which controls the fluctuation, can be registered from time to time by using these face images, and highly accurate face identification can be achieved.

Further, in the configuration of the second feature portion (automatic updating of face images) of the apparatus for registering face identification features described above, additional face images are obtained from video images of TV broadcasting programs. However, an image receiving portion for receiving video images via a network is provided instead of the TV broadcasting wave receiving portion 15, wherein the face images may be updated and registered by adding the face images while determining continuity of video images supplied from the network.

That is, the normalized face image extracting portion 61 is provided which extracts normalized face images from the face images by the unit of frame image having faces appearing, using video images from the network with respect to the person's names appointed by the celebrity name, face image, feature database 13, and thereby the features of additional images maybe re-registered in the celebrity name, face image and feature database 13.

In such a structure, for example, if names of persons picked up in association with video images are given to and recorded in the image information when carrying out editing work via a network with respect to video images personally picked up, it becomes possible to re-register the persons using additional images, wherein the structure maybe applied to registration of face images in editing work of personally prepared face images.

Next, a description is given of the configuration of the third feature portion (framing of automation) of the apparatus for registering face identification features in FIG. 1.

The third feature portion (framing of automation) is composed of a TV broadcasting wave receiving portion 15, a recording portion (encoder) 16, a recorded program information extracting portion 17, a recorded program information database 18, a video image database 19, a selection program information extracting portion 1A, a reproduction portion 1B and a meta-information giving portion 1D.

The TV broadcasting wave receiving portion 15 receives TV broadcasting waves and separates the same into TV program images and an electronic TV program table. For example, since general TV broadcasting is in the format of MPEG-2TS and the broadcasting waves are overlapped on carrier waves and transmitted altogether, the TV program image portion is separated to be in the publicly known format of MPEG-2ES and the electronic TV program table is separated to be in the publicly known format of EPG.

The recording portion 16 converts TV program images separated by the TV broadcasting wave receiving portion 15 to a format in which the images can be accumulated in a recording medium. Where the recording medium is videotape of a magnetic medium or an electronic medium, the TV program images are coded in the publicly known format of MPEG-2 as it is or in the format of H.264.

The recorded program information extracting portion 17 extracts a program title, broadcasting date and time, channel, genre, and a list of performer celebrities regarding a TV program, which becomes an object to be recorded, from the electronic TV program table obtained by the TV broadcasting wave receiving portion 15 or via a network as program information, and further generates a unique program identifier to identify respective programs from the program information.

FIG. 9 illustrates an electronic TV program table extracted by the recorded program information extracting portion 17. In the electronic TV program table, the vertical lines show program information per hour and the horizontal lines show program information per channel. The program titles, broadcasting date and time, channel, genre, and a list of performer celebrities are described as the program information.

For example, it is described that the program title of the broadcasting time 19:00 through 19:57 in Channel 8ch is [OOOOO], and [XXXX], [XXXX] and [XXXX] appear as performers. Further, it is assumed that the program identifier generated by the TV program information is [123456].

The recorded program information database 18 (FIG. 1) causes the program titles, broadcasting date and time, channels, genres, lists of performer celebrities and program identifiers regarding recorded TV programs extracted and generated by the recorded program information extracting portion 17 to be associated with each other and registers the same as the program information. FIG. 10 shows one example of the program information registered in the recorded program database 18.

The video image database 19 causes file names, which are generated based on the program identifiers generated by the recorded program information extracting portion 17, to be associated with the TV program images converted by the recording portion 16 and accumulates the same therein.

The selection program information extracting portion 1A selects one recorded program from the program information registered in the recorded program information database 18 and extracts the program identifier regarding the selected TV program and the list of names of celebrities appearing thereon.

The reproduction portion 1B reads TV program images of the file name based on the program identifier generated by the selection program information extracting portion 1A from the video image database 19, decodes the same where the video images are coded in the format of MPEG-2 and H.246, etc., and reproduces the TV program images frame by frame.

The meta-information giving portion 1D gives the names of appearing celebrities, shot-change positions, information of the appearing zone of the same persons, which are secondarily obtained by the face similarity calculating portion 62 and the face tracking portion 63 in FIG. 6, to the program information of the corresponding TV programs registered in the recorded program information database 18 as meta-information. The information is utilized as meta-information for retrieval of appearing persons from TV program images frame by frame.

According to the configuration of the third feature portion (framing of automation) of the apparatus for registering face identification features, when reproducing TV broadcasting programs received by the TV broadcasting wave receiving portion 15 by the reproduction portion 1B, it becomes possible to construct an environment in which TV program images becoming inputs and the names of celebrities appearing thereon are provided day by day in a state where they are associated with each other.

In addition, since the above-described function can be used to re-register the latest face images of celebrities, it becomes possible to prepare the features that prevent chronological fluctuations.

In the above-described example, a description was given of an apparatus for registering face identification features that embodies the present invention. However, if the following steps (1) through (3) carried out in the apparatus for registering face identification features are stored in a recording medium that can execute the above steps as a program, a general personal computer can be used as the apparatus for registering face identification features by installing the program of the recording medium in the personal computer that is provided with a CPU, a ROM, a RAM, an input device, a display device, and a network connection feature.

(1) Face image retrieving step for retrieving face images of a person's name via a network using the person's name as a keyword.
(2) Face feature extracting step for extracting the features, which greatly influence identification of a person, from the face images retrieved by the face image retrieving portion.
(3) Registration step for registering the face images retrieved in the face image retrieving step and the face features extracted in the face feature extracting step in the person's name, face image and feature database in a state where they are associated with the person's name.

The apparatus for registering face identification features described above is expected to be mounted in a hard disk recorder and a STB for recording and viewing TV images. For consumers, programs in which desired persons appear can be specified and retrieved not only by the unit of program but also by the unit of scene where the persons appear. Further, the apparatus for registering face identification features can be utilized for a solution business as a part of performer meta-information giving tool based on faces for program production bureaus.

In addition, the face feature database of TV performers, which is prepared by the apparatus for registering face identification features described above is not limited to retrieval of TV images. For example, the apparatus may be used for entertainment such as determination of famous people for whom among TV performers a person in front of a camera mounted in the apparatus for registering face identification features resembles.

What is claimed is:
1. An apparatus for registering face identification features, comprising:
  a face image retrieving portion for retrieving a face image of a person via a network using the person's name as a keyword;
  a face feature extracting portion for extracting features, which greatly influence identification of a person, from the face image retrieved by the face image retrieving portion;
  a person's name, face image and feature database for registering the face image retrieved by the face image retrieving portion and the face feature extracted by the face feature extracting portion in a state where they are associated with the person's name;
  an image receiving portion for video images via a network;
  a normalized face image extracting portion for extracting a normalized face image from face images by the unit of frame image having a face appearing thereon using the video image as input with respect to a person's name designated by the person's name, face image and feature database;
  a face similarity calculating portion for calculating a similarity between the feature extracted by the normalized face image extracting portion and the feature of the person designated by the person's name, face image and feature database;
  a face tracking portion for detecting a face from the video images frame by frame, determining identity of a person based on continuity of video images from the relationship between frames of positions of the face region obtained as a result of face detection, and specifying the zone in which the same person appears; and
  an additional face image extracting portion for specifying frames showing similarity exceeding a threshold value in the appearing zone of a specified person, and extracting face images of the previous and next frames thereof as additional faces; and wherein the face feature extracting portion extracts the feature from the additional image of the additional face image extracting portion and re-registers the feature of the additional image in the person's name, face image and feature database as an image of a person's name designated in the person's name, face image and feature database.

2. An apparatus for registering face identification features, comprising:

a face image retrieving portion for retrieving a face image of a person via a network using the person's name as a keyword;

a face feature extracting portion for extracting features, which greatly influence identification of a person, from the face image retrieved by the face image retrieving portion;

a person's name, face image and feature database for registering the face image retrieved by the face image retrieving portion and the face feature extracted by the face feature extracting portion in a state where they are associated with the person's name;

a TV broadcasting wave receiving portion for receiving TV broadcasting waves and separating the same into TV program images and an electronic TV program table;

a normalized face image extracting portion for extracting a normalized face image from face images by the unit of frame image having a face appearing thereon using the TV program images as input;

a face similarity calculating portion for calculating similarity between the feature extracted by the normalized face image extracting portion and the feature of persons registered in the person's name, face image and feature database;

a face tracking portion for detecting a face from the TV program images frame by frame, determining identity of a person based on continuity of video images from the relationship between frames of positions of the face region obtained as a result of face detection, and specifying the zone in which the same person appears; and an additional face image extracting portion for specifying frames showing similarity exceeding a threshold value in the appearing zone of a specified person, and extracting face images of the previous and next frames thereof as additional faces; and wherein the face feature extracting portion extracts the feature from the additional image of the additional face image extracting portion and re-registers the feature of the additional image in the person's name, face image and feature database as an image of a person's name in the person's name, face image and feature database.

3. The apparatus for registering face identification features according to claim 2, wherein the face similarity calculating portion includes means for narrowing down objects to be identified based on the names of performers of the electronic TV program table.

4. The apparatus for registering face identification features according to claim 2, further including:

a recording portion for converting TV program images separated by the TV broadcasting wave receiving portion to a format in which the TV program images can be accumulated in a recording medium;

a recorded program information extracting portion for extracting a program title, broadcasting date and time, channel, genre, a list of performer celebrities, and a program identifier regarding a TV program, which becomes an object to be recorded, from the electronic TV program table obtained by the TV broadcasting wave receiving portion or via a network as program information, and further generating a unique program identifier to identify respective programs from the program information;

a recorded program information database for causing a program title, broadcasting date and time, channel, genre, a list of performer celebrities, and a program identifier regarding recorded TV programs extracted by the recorded program information extracting portion to be associated with each other and registering the same therein as program information;

a video image database for causing file names generated based on the program identifier generated by the recorded program information extracting portion to be associated with TV program images converted by the recording portion and accumulating the same therein;

a selection program information extracting portion for extracting a program identifier regarding a selected TV program and a list of names of celebrities appearing on the program from the program information registered in the recorded program information database; and a reproduction portion for reading a TV program image carrying the file name based on the program identifier generated by the selection program information extracting portion and reproducing the same.

5. The apparatus for registering face identification features according to claim 3, further including:

a recording portion for converting TV program images separated by the TV broadcasting wave receiving portion to a format in which the TV program images can be accumulated in a recording medium;

a recorded program information extracting portion for extracting a program title, broadcasting date and time, channel, genre, a list of performer celebrities, and a program identifier regarding a TV program, which becomes an object to be recorded, from the electronic TV program table obtained by the TV broadcasting wave receiving portion or via a network as program information, and further generating a unique program identifier to identify respective programs from the program information;

a recorded program information database for causing a program title, broadcasting date and time, channel, genre, a list of performer celebrities, and a program identifier regarding recorded TV programs extracted by the recorded program information extracting portion to be associated with each other and registering the same therein as program information;

a video image database for causing file names generated based on the program identifier generated by the recorded program information extracting portion to be associated with TV program images converted by the recording portion and accumulating the same therein;

a selection program information extracting portion for extracting a program identifier regarding a selected TV program and a list of names of celebrities appearing on the program from the program information registered in the recorded program information database; and a reproduction portion for reading a TV program image carrying the file name based on the program identifier generated by the selection program information extracting portion and reproducing the same.

6. The apparatus for registering face identification features according to claim 4, further including a meta-information giving portion that gives information such as names of appearing celebrities, and appearing zones of the same person, which is secondarily obtained by the face similarity calculating portion and the face tracking portion to the program information of the corresponding TV program registered in the recorded program information database as meta-information.

7. The apparatus for registering face identification features according to claim 5, further including a meta-information giving portion that gives information such as names of appearing celebrities, and appearing zones of the same person, which is secondarily obtained by the face similarity calculating portion and the face tracking portion to the program information of the corresponding TV program registered in the recorded program information database as meta-information.

8. An apparatus for registering face identification features, comprising:
   a face image retrieving portion for retrieving a face image of a person via a network using the person's name as a keyword;
   a face feature extracting portion for extracting features, which greatly influence identification of a person, from the face image retrieved by the face image retrieving portion;
   a person's name, face image and feature database for registering the face image retrieved by the face image retrieving portion and the face features extracted by the face feature extracting portion in a state where they are associated with the person's name;
   an image receiving portion for receiving video images;
   a normalized face image extracting portion for extracting a normalized face image from face images by the unit of frame image having a face appearing thereon using the video images as input;
   a face similarity calculating portion for calculating a similarity between the normalized face image extracted by the normalized face image extracting portion and the features in the person's name, face image and feature database;
   a face tracking portion for detecting a face from the video images frame by frame, determining identity of a person based on continuity of video images from the relationship between frames of positions of the face region obtained as a result of face detection, and specifying the zone in which the same person appears; and
   an additional face image extracting portion for specifying frames showing similarity exceeding a threshold value in the appearing zone of a specified person, and extracting face images of the previous and next frames thereof as additional images; and
   wherein the face feature extracting portion is arranged to extract the features from the additional images of the additional face image extracting portion and is arranged to re-register the features of the additional images in the person's name, face image and feature database as images in the person's name, face image and feature database.

9. The apparatus for registering face identification features according to claim 8, wherein:
   the image receiving portion is arranged to receive video images via a network;
   the normalized face image extracting portion is arranged to extract a normalized face image from face images by the unit of frame image having a face appearing thereon using the video image as input with respect to a person's name designated by the person's name, face image and feature database;
   the face similarity calculating portion is arranged to calculate a similarity between the normalized face image extracted by the normalized face image extracting portion and the features of the person designated by the person's name, face image and feature database; and
   the face feature extracting portion is arranged to extract the features from the additional images of the additional face image extracting portion and is arranged to re-register the features of the additional images in the person's name, face image and feature database as images of a person's name designated in the person's name, face image and feature database.

10. The apparatus for registering face identification features according to claim 8, wherein:
   the image receiving portion is a TV broadcasting wave receiving portion for receiving TV broadcasting waves and separating the same into TV program images and an electronic TV program table;
   the normalized face image extracting portion is arranged to extract a normalized face image from face images by the unit of frame image having a face appearing thereon using the TV program images as input;
   the face similarity calculating portion is arranged to calculate similarity between the normalized face image extracted by the normalized face image extracting portion and the feature of persons registered in the person's name, face image and feature database;
   the face tracking portion is arranged to detect a face from the TV program images frame by frame, is arranged to determine identity of a person based on continuity of video images from the relationship between frames of positions of the face region obtained as a result of face detection, and is arranged to specify the zone in which the same person appears; and
   the face feature extracting portion is arranged to extract the features from the additional image of the additional face image extracting portion and is arranged to re-register the feature of the additional image in the person's name, face image and feature database as an image of a person's name in the person's name, face image and feature database.

11. The apparatus for registering face identification features according to claim 8, wherein the face image retrieving portion includes an image retrieving portion for retrieving images via a network based on a retrieval keyword; and a face detecting portion for detecting a region, in which a face exists, from the image retrieved by the image retrieving portion,
   the face image retrieving portion is devised so as to retrieve only images, in which a face is correctly included, by outputting a face image only where the face is detected from the images retrieved by the detection portion, and
   the face detecting portion includes re-retrieval notifying means for notifying a re-retrieval request from the face detecting portion to the image retrieving portion where no face is detected from the images retrieved by the image retrieving portion.

12. The apparatus for registering face identification features according to claim 11 further including a celebrity name extracting portion for extracting a celebrity name described in a list of performers of respective TV programs from an electronic TV program table acquired by receiving and separating TV broadcasting waves or an electronic TV program table acquired via a network,
   wherein the face image retrieving portion is configured so as to retrieve face images of a celebrity name via the network using the celebrity name, which is extracted by the celebrity name extracting portion, as a retrieval keyword.

13. The apparatus for registering face identification features according to claim 10, wherein the face similarity calculating portion includes means for narrowing down objects to be identified based on the names of performers of the electronic TV program table.

14. The apparatus for registering face identification features according to claim 10, further comprising:
- a recording portion for converting TV program images separated by the TV broadcasting wave receiving portion to a format in which the TV program images can be accumulated in a recording medium;
- a recorded program information extracting portion for extracting a program title, broadcasting date and time, channel, genre, a list of performer celebrities, and a program identifier regarding a TV program, which becomes an object to be recorded, from the electronic TV program table obtained by the TV broadcasting wave receiving portion or via a network as program information, and further generating a unique program identifier to identify respective programs from the program information;
- a recorded program information database for causing a program title, broadcasting date and time, channel, genre, a list of performer celebrities, and a program identifier regarding recorded TV programs extracted by the recorded program information extracting portion to be associated with each other and registering the same therein as program information;
- a video image database for causing file names generated based on the program identifier generated by the recorded program information extracting portion to be associated with TV program images converted by the recording portion and accumulating the same therein;
- a selection program information extracting portion for extracting a program identifier regarding a selected TV program and a list of names of celebrities appearing on the program from the program information registered in the recorded program information database; and
- a reproduction portion for reading a TV program image carrying the file name based on the program identifier generated by the selection program information extracting portion and reproducing the same.

15. The apparatus for registering face identification features according to claim 13, further comprising:
- a recording portion for converting TV program images separated by the TV broadcasting wave receiving portion to a format in which the TV program images can be accumulated in a recording medium;
- a recorded program information extracting portion for extracting a program title, broadcasting date and time, channel, genre, a list of performer celebrities, and a program identifier regarding a TV program, which becomes an object to be recorded, from the electronic TV program table obtained by the TV broadcasting wave receiving portion or via a network as program information, and further generating a unique program identifier to identify respective programs from the program information;
- a recorded program information database for causing a program title, broadcasting date and time, channel, genre, a list of performer celebrities, and a program identifier regarding recorded TV programs extracted by the recorded program information extracting portion to be associated with each other and registering the same therein as program information;
- a video image database for causing file names generated based on the program identifier generated by the recorded program information extracting portion to be associated with TV program images converted by the recording portion and accumulating the same therein;
- a selection program information extracting portion for extracting a program identifier regarding a selected TV program and a list of names of celebrities appearing on the program from the program information registered in the recorded program information database; and
- a reproduction portion for reading a TV program image carrying the file name based on the program identifier generated by the selection program information extracting portion and reproducing the same.

16. The apparatus for registering face identification features according to claim 14, further including a meta-information giving portion that gives information such as names of appearing celebrities, and appearing zones of the same person, which is secondarily obtained by the face similarity calculating portion and the face tracking portion to the program information of the corresponding TV program registered in the recorded program information database as meta-information.

17. The apparatus for registering face identification features according to claim 15, further including a meta-information giving portion that gives information such as names of appearing celebrities, and appearing zones of the same person, which is secondarily obtained by the face similarity calculating portion and the face tracking portion to the program information of the corresponding TV program registered in the recorded program information database as meta-information.

18. A method for registering face identification features, comprising the steps of:
- retrieving face images of a person via a network using the person's name as a keyword;
- extracting the features, which greatly influence identification of persons, from the face images retrieved by the face image retrieving portion;
- registering the face images retrieved in the face image retrieving step and the face features extracted in the face feature extracting step in the person's name, face image and feature database in a state where they are associated with the person's name;
- receiving the video images;
- extracting a normalized face image from face images by the unit of frame image having a face appearing thereon using the video image as input;
- calculating a similarity between the extracted normalized face image and the features in the person's name, face image and feature database;
- detecting a face from the video images frame by frame, determining identity of a person based on continuity of video images from the relationship between frames of positions of the face region obtained as a result of face detection, and specifying the zone in which the same person appears;
- specifying frames showing a similarity exceeding a threshold value in the appearing zone of a specified person, and extracting face images of the previous and next frames thereof as additional images; and
- extracting the features from the additional images and re-registering the features of the additional images in the person's name, face image and feature database as images in the person's name, face image and feature database.

19. A non-transitory computer readable medium having stored thereon an executable program that when executed by a processor causes the processor to perform steps comprising:

retrieving face images of a person via a network using the person's name as a keyword;

extracting the features, which greatly influence identification of persons, from the face images retrieved by the face image retrieving portion;

registering the face images retrieved in the face image retrieving step and the face features extracted in the face feature extracting step in the person's name, face image and feature database in a state where they are associated with the person's name;

receiving the video images;

extracting a normalized face image from face images by the unit of frame image having a face appearing thereon using the video image as input;

calculating a similarity between the extracted normalized face image and the features in the person's name, face image and feature database;

detecting a face from the video images frame by frame, determining identity of a person based on continuity of video images from the relationship between frames of positions of the face region obtained as a result of face detection, and specifying the zone in which the same person appears;

specifying frames showing similarity exceeding a threshold value in the appearing zone of a specified person, and extracting face images of the previous and next frames thereof as additional images; and extracting the features from the additional images and re-registering the features of the additional images in the person's name, face image and feature database as images in the person's name, face image and feature database.

* * * * *